United States Patent
Fukushima et al.

(10) Patent No.: US 8,614,738 B2
(45) Date of Patent: Dec. 24, 2013

(54) STEREOSCOPIC IMAGE DISPLAY METHOD AND STEREOSCOPIC IMAGE DISPLAY APPARATUS

(75) Inventors: Rieko Fukushima, Tokyo (JP); Akira Morishita, Tokyo (JP); Yoshiyuki Kokojima, Yokohama (JP); Yuzo Hirayama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 87 days.

(21) Appl. No.: 13/431,485

(22) Filed: Mar. 27, 2012

(65) Prior Publication Data

US 2012/0229610 A1 Sep. 13, 2012

Related U.S. Application Data

(63) Continuation of application No. PCT/JP2009/066825, filed on Sep. 28, 2009.

(51) Int. Cl.
*H04N 13/02* (2006.01)
*H04N 13/00* (2006.01)

(52) U.S. Cl.
USPC ............................................. 348/47; 348/42

(58) Field of Classification Search
USPC .......... 348/47, E13.074, E13.075, 51–59, 42, 348/139; 375/240.01
See application file for complete search history.

(56) References Cited

U.S. PATENT DOCUMENTS

| 7,643,552 | B2 | 1/2010 | Saishu et al. |
| 2006/0215021 | A1 | 9/2006 | Suto et al. |
| 2009/0079733 | A1 | 3/2009 | Fukushima et al. |

FOREIGN PATENT DOCUMENTS

| JP | 8-317429 | 11/1996 |
| JP | 2004-343290 | 12/2004 |
| JP | 2005-331844 | 12/2005 |
| JP | 2006-13609 | 1/2006 |
| JP | 2006-270265 | 10/2006 |

OTHER PUBLICATIONS

English Translation of international Preliminary Report on Patentability and Written Opinion of the International Searching Authority for corresponding application PCT/JP2009/066825, mailed Apr. 19, 2012 (5 pages).
Fukushima et al., "Effect of ligh ray overlap between neighboring parallax images in autostereoscopic 3D displays," Proceedings of SPIE (2009), 7237:72370W-1-72370W-12.
International Search Report from Japanese Patent Office for International Application No. PCT/JP2009/066825, mailed Dec. 8, 2009.
Hoshino, H. et al., "Analysis of resolution limitation of integral photography," J. Opt. Soc. Am. A, vol. 15, No. 8, pp. 2059-2065 (1998).
Fukushima, R. et al., "Novel viewing zone control method for computer generated integral 3-D imaging," SPIE-IS&T Electronic Imaging, SPIE vol. 5291, pp. 81-92 (2004).

*Primary Examiner* — David Czekaj
*Assistant Examiner* — Dramos I Kalapodas
(74) *Attorney, Agent, or Firm* — Finnegan, Henderson, Farabow, Garrett & Dunner, LLP (57) ABSTRACT

In a stereoscopic image imaging method which captures an image of an object to be displayed as a stereoscopic image, a three-dimensional image is generated in real time from multi-viewpoint images captured by a multi-camera, and is displayed on a viewer provided to the multi-camera, thus allowing a photographer to adjust an imaging condition. The photographer is informed of parameters, which implements a display state adjusted by an observer of a three-dimensional display while observing the three-dimensional image, via the viewer, and the photographer can capture appropriate multi-viewpoint images.

5 Claims, 10 Drawing Sheets

STEREOSCOPIC IMAGE DISPLAY METHOD AND STEREOSCOPIC IMAGE DISPLAY APPARATUS

CROSS-REFERENCE TO RELATED APPLICATIONS

This application is a Continuation Application of PCT Application No. PCT/JP2009/066825, filled Sep. 28, 2009, the entire contents of which are incorporated herein by reference.

FIELD

Embodiments described herein relate generally to a stereoscopic image display method and stereoscopic image display apparatus for capturing an image of an object, and displaying a stereoscopic image.

BACKGROUND

As a display apparatus which can display a three-dimensional image (stereoscopic image), various systems are known. In recent years, especially, a system, which adopts a flat-panel type, and displays a stereoscopic image without requiring any dedicated glasses and the like, is demanded more strongly. There has been developed a system which is provided with a display panel (display device) and a parallax barrier (also called a ray control element) arranged in front of a display screen of the display panel (display device). The display panel displays an image or a picture on the display screen having pixels fixed on a plane, like a direct-view or projection type stereoscopic moving image display device (for example, a liquid crystal display device or plasma display device) and the parallax barrier controls rays coming from the display panel to direct them toward an observer. This system is a practical system which can relatively easily display a stereoscopic image.

A so-called parallax barrier controls rays so as to allow an observer to observe different images depending on observation angles even when the observer observes the same parallax barrier position. More specifically, when a right-and-left parallax (horizontal parallax) is given, slits or a lenticular sheet (cylindrical lens array) is used as the parallax barrier. When both the right-and-left parallax and an up-and-down parallax (vertical parallax) are given, a pinhole array or lens array is used as the parallax barrier. In this specification, one slit or one lens as a unit of the parallax barrier is called an exit pupil.

The system using the parallax barrier is further classified into a two-view system, multi-view system, ultra-multi-view system (ultra-multi-view conditions are given to the multi-view system), and integral imaging (to be simply referred to as "II" hereinafter) system. The basic principle of these systems is substantially the same as a stereoscopic photo system invented about 100 years ago. However, since the number of pixels of a display device is finite, the number of pixels assigned per exit pupil is also finite. In this specification, the number of pixels assigned per exit pupil is called the number of parallaxes, and a two-dimensional image configured by pixels assigned to respective exit pupils is called an element image.

Note that the II system is a term of stereoscopic photography, and is also called integral photography (to be also abbreviated as IP hereinafter).

In order to display a stereoscopic image using these II systems, images (multi-viewpoint images) captured from a plurality of directions are required. That is, in a stereoscopic image display method based on the two-view system, two multi-viewpoint images are prepared. In a stereoscopic image display method based on the multi-view system or II system, multi-viewpoint images as many as the number of pixels corresponding to the number of parallaxes assigned per exit pupil are prepared. In this specification, a pixel means a minimum display unit. Basically, multi-viewpoint images are captured under the precondition of the relationship between pixels and exit pupils. A multi-viewpoint image generation method includes a plurality of generation methods such as actual imaging and CG rendering. However, multi-viewpoint images are normally prepared by actual imaging that captures images of an object using cameras.

In the actual imaging using the cameras, more specifically, cameras as many as the number of parallaxes, which are used to capture multi-viewpoint images, are laid out, so as to be symmetrical to a relationship between exit pupils and corresponding pixel positions. The cameras laid out to capture multi-viewpoint images are called a multi-camera. Since pixels of a display device are arranged on a plane, the multi-camera is similarly arranged on a plane. In a stereoscopic display device, letting pp be a pixel interval, and g be an interval between an exit pupil and a pixel plane of the display device, an imaging reference distance Lc and interval x_c of a multi-camera 1 in the stereoscopic display device are given by:

$$g:pp=Lc:x\_c$$

This imaging condition means that it is most efficient to match a size and resolution of an imaging reference plane of the multi-camera with those of a flat-panel display unit in the display device, so as to satisfy the imaging condition in the multi-camera in a stereoscopic imaging device and the flat-panel display unit in the stereoscopic display device. In this case, the imaging reference plane is called a projection plane under the precondition that it is matched with the display screen, the imaging reference distance is set as an observation reference visual distance of a three-dimensional display, and an imaging position is set as a viewpoint on the observation reference plane of the three-dimensional display. In addition, rays at the time of imaging and playback agree with each other, and an image of an object to be captured is displayed in a real scale.

However, this actual imaging condition need not always be strictly satisfied. In recent years, when it is designed to observe information of neighboring pixels to be mixed to some extent, it is devised to allow an observer to observe a stereoscopic image even outside an observation distance range as disclosed in R. Fukushima et al., Proceedings of SPIE-IS & T Electronic Imaging, 7237, 72370W-1 (2009). Furthermore, in a three-dimensional display based on the parallax barrier system, a display range in its z direction (a direction perpendicular to the display screen) is limited as disclosed in J. Opt. Soc. Am. A vol. 15, p. 2059 (1998). Therefore, a multi-camera which captures multi-viewpoint images more than the number of viewpoints is prepared, multi-viewpoint images having an interval x_c smaller than a design value are selected from the multi-camera, and images which are compressed in the z direction are often displayed as disclosed in JP-A 2005-331844 (KOKAI). In this case, the z direction means a depth direction which is perpendicular to a horizontal direction x and vertical direction y of a three-dimensional display screen, and corresponds to a back surface side of the display screen. Also, a method of displaying a stereoscopic image within a display range by shifting z coordinates of existing multi-viewpoint images upon displaying the stereoscopic image and enlarging or reducing them in the x and y directions, so as to adjust clipping ranges used as parallax images, that is, clipping methods is known as disclosed in JP-A 2004-343290 (KOKAI). These literatures merely disclose a display method of a stereoscopic image to be displayed by selecting already captured multi-viewpoint images or adjusting clipping ranges.

In order to change z coordinates upon displaying a stereoscopic image, more specifically, a shift value for each viewpoint image within a range used as a parallax image need only be changed. However, in case of actual imaging, since multi-viewpoint images are perspective projection images, when the projection plane is shifted forward or backward along the z axis upon changing the shift value, the imaging reference distance is different from the observation reference visual distance of the three-dimensional display, and a distortion is generated in a strict sense. In order to display a stereoscopic image free from any distortion, the imaging reference distance to an object to be mainly displayed has to be set to be equal to the observation reference visual distance of the three-dimensional display in place of the acquired multi-viewpoint images which have undergone post-processing, and are reconstructed to display a stereoscopic image. However, there is no method which allows a photographer to correctly recognize the imaging reference distance, and the imaging reference distance cannot be correctly set. Also, there is no method which allows a photographer to know which object an observer of the three-dimensional display located at a remote place wants to mainly and stereoscopically display. Since this object to be stereoscopically displayed does not become clear, the imaging reference distance cannot be set due to that cause.

DETAILED DESCRIPTION

There will be described a stereoscopic image display method and stereoscopic image display apparatus for capturing an image of an object, and displaying a stereoscopic image, in detail hereinafter with reference to the drawings.

According to an embodiment, there is provided a stereoscopic image display apparatus comprises a first three-dimensional display device. The first three-dimensional display device includes a first display unit configured to display a 2D image, the 2D image including elemental images, and a first light control unit configured to control directions of light rays emitted from the first display unit. The first display unit displays each of the elemental images in a first specific area determined with the directions of the controlled light rays, so as to display a three dimensional image.

The stereoscopic image display apparatus further comprises a multi camera configured to capture multi-viewpoint images of a real object from specific view points placed at certain intervals, wherein the multi-camera has a projection plane serving as an imaging reference plane, an image processing unit configured to process images taken by the multi camera. The image processing unit includes a parallax image generation unit configured to generate parallax image data including clip parallax images having specified ranges which are clipped from the multi-viewpoint images based on information about clipping ranges of the multi-viewpoint images, a sort processing unit configured to sort pixels from the clip parallax images and rearrange the sorted pixels to generate the elemental images, and a display condition adjustment unit configured to adjust parameters required to display the three-dimensional image. The parameters are so adjusted as to capture the real object as the multi-viewpoint images having a desired size at the vicinity of the projection plane with reference to the displayed three-dimensional image.

The image processing unit is configured to correct the imaging reference distance and the intervals of the view points based on the adjusted parameters and the imaging condition to derive a corrected imaging reference distance and a corrected interval, which are required to display the three-dimensional image without any distortion.

In the following description of the embodiment, a parallax presentation direction of a three-dimensional display is limited to one dimension (horizontal direction: X direction). However, the present embodiment is also applicable to a display method and apparatus for displaying parallax information also in a direction (vertical direction: Y direction) perpendicular to this one-dimensional direction (horizontal direction: X direction). That is, when the present embodiment is applied to the vertical direction (Y direction) as in the horizontal direction (X direction), parallax information can be similarly given in two-dimensional directions (horizontal and vertical directions: X and Y directions). Therefore, a stereoscopic image display method and apparatus according to the present embodiment not only includes an embodiment which presents parallaxes in only the one-dimensional direction, but also substantially includes an embodiment which presents parallaxes also in the two-dimensional directions.

Figure 1:
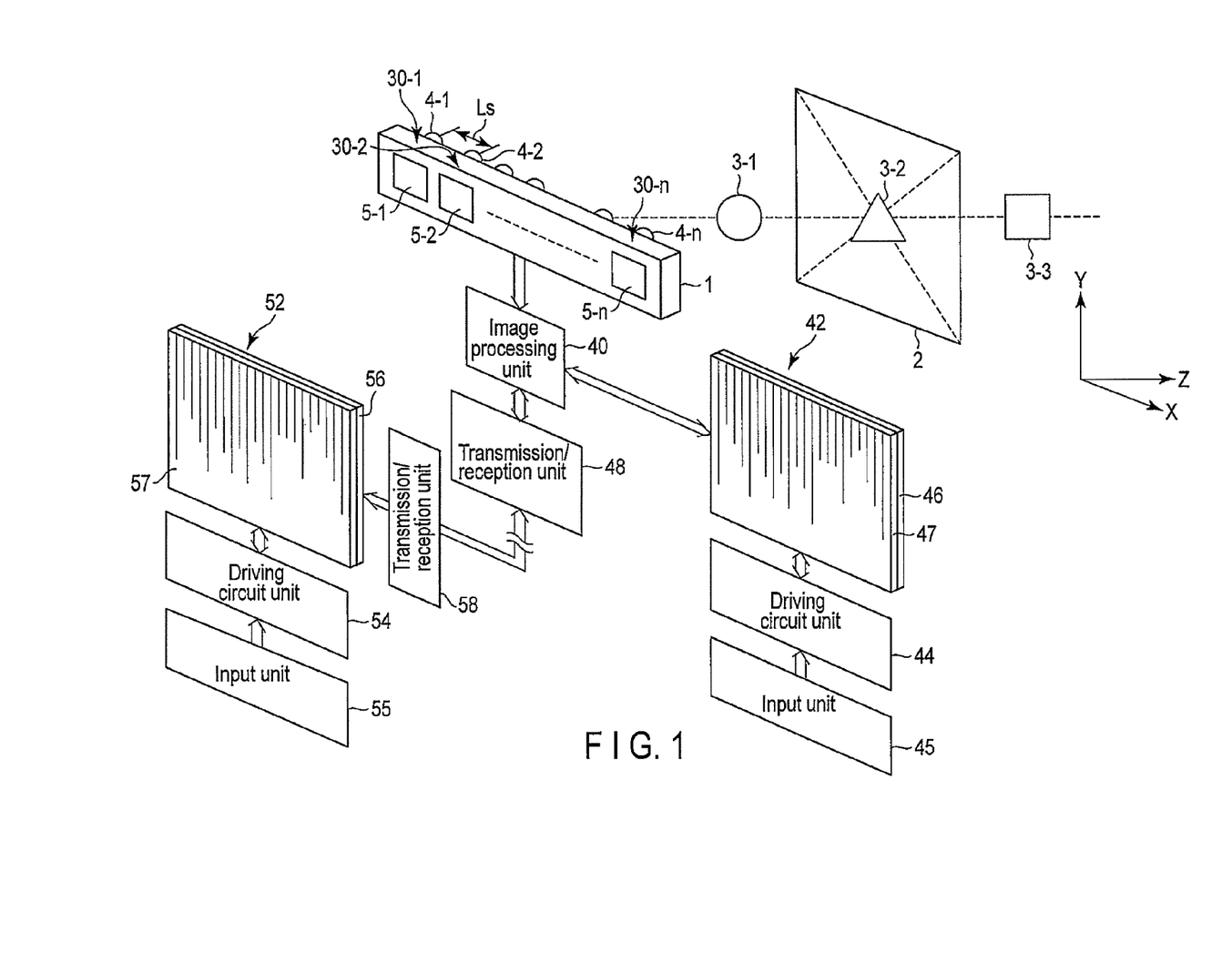
FIG. 1 is a block diagram showing a multi-camera imaging system used to capture a stereoscopic image according to an embodiment, the block diagram also showing a layout relationship among a multi-camera, real objects to be captured, and a projection plane.

FIG. 1 shows a multi-camera imaging system, which captures a stereoscopic image, according to the embodiment. FIG. 1 schematically shows a layout relationship between real objects 3-1, 3-2, and 3-3 to be captured by a multi-camera 1, and a projection plane 2.

As shown in FIG. 1, with respect to the multi-camera 1 and projection plane 2, the real object 3-1 indicated by "○" can be laid out in front of the projection plane 2 along a Z direction, the real object 3-2 indicated by "△" can be laid out on the projection plane 2, or the real object 3-3 indicated by "□" can be laid out on the back side of the projection plane 2 along the Z direction. In this case, the multi-camera 1 side with respect to the projection plane 2 is defined as the front side, and the side opposite to the multi-camera 1 is defined as the back side of the projection plane 2. FIG. 1 shows coordinate axes (X, Y, Z) to clarify the layout relationship among the multi-camera 1, real objects 3-1, 3-2, and 3-3, and projection plane 2. With reference to these coordinate axes, the projection plane 2 is defined as a plane which extends in X and Y axes perpendicular to a Z axis. In the example of FIG. 1, the real objects 3-1, 3-2, and 3-3 are arrayed along the Z axis.

Data of 2D images (i.e., planar images), which are captured at a certain field angle by the multi-camera 1 shown in FIG. 1, undergo processing required to display a stereoscopic image i.e., 3D image in an image processing unit 40 to be converted into element image data. Data of these element images are supplied to a driving circuit unit 44 of a photographer's display unit 42 provided, as a viewer device, to a housing of the multi-camera 1. The element image data are displayed in real time on a display panel 46, and a stereoscopic image is observed by a photographer as captured images via a parallax barrier 47. As will be described in detail later, the photographer inputs an instruction from an input unit 45 to the image processing unit 40 with reference to the captured images. Then, an object to be captured on which the photographer focuses interest, for example, one of the real objects 3-1, 3-2, and 3-3 can be specified. An optimal imaging condition required to display the specified object to be captured can be set. The photographer can capture the object according to this imaging condition.

In the imaging system shown in FIG. 1, element image data from the image processing unit 40 are transferred to a transmission/reception unit 58 of an observation display device 52 for an observer via a transmission/reception unit 48. The imaging display device 42 is visually confirmed by the photographer who captures an object in a studio, and is used for stereoscopic imaging. By contrast, the observation display device 52 corresponds to a display device placed in a monitor room distant from the studio or that to be observed by observation public who observe stereoscopic image programs. The observer's display device 52 includes a driving circuit unit 54 which receives element image data transferred to the transmission/reception unit 58 as in the photographer's display device 42. This driving circuit unit 54 displays element images in real time on a display panel 56, and allows an observer to observe a stereoscopic image as captured images via a parallax barrier 57. As will be described in detail later, the observer inputs an instruction to the image processing unit 40 from an input unit 55 with reference to the captured images. Thus, an object to be captured on which the observer focuses interest, for example, one of the real objects 3-1, 3-2, and 3-3 can be specified. An optimal imaging condition required to display the specified object to be captured can be set. The photographer can capture the object according to this imaging condition.

Figure 2:
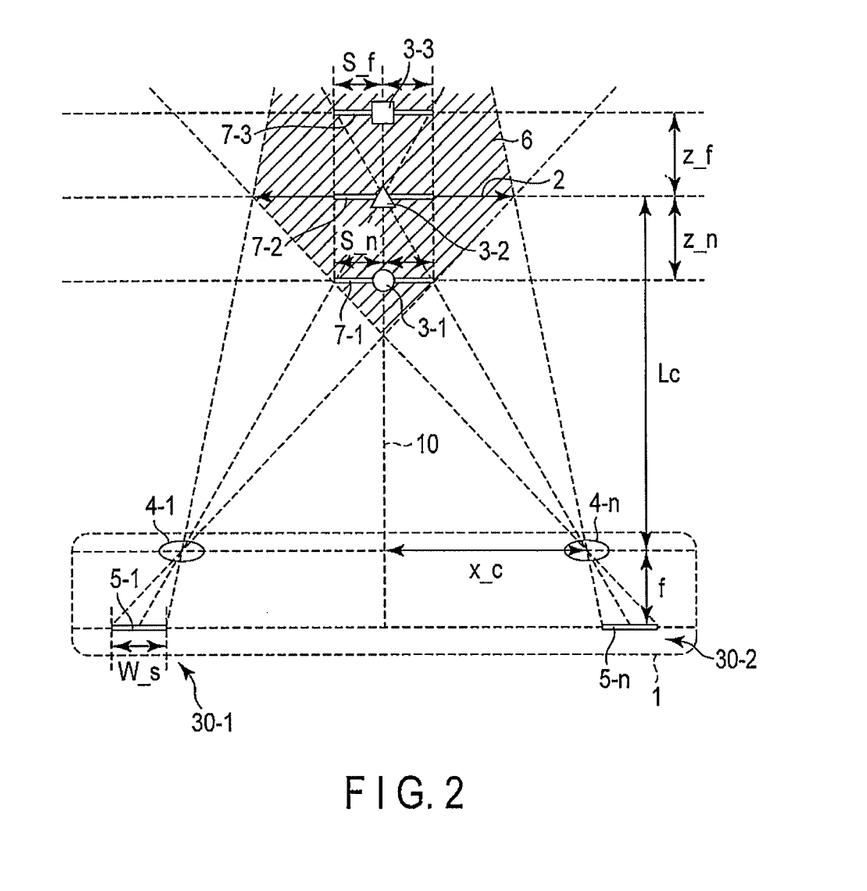
FIG. 2 is a planar layout view showing the relationship among the multi-camera, real objects to be captured, and projection plane in the system for capturing a stereoscopic image shown in FIG. 1.

As shown in FIG. 2, the multi-camera 1 is configured by linearly arraying a plurality of imaging units 30-1 to 30-n as combinations of lenses 4 (4-1 to 4-n) and imaging elements 5 (5-1 to 5-n) on a plane along the X direction. Note that "n" corresponds to the number of parallaxes, and an array interval (camera pitch) of the lenses 4-1 to 4-n is called a camera interval Ls. The camera interval Ls may also be given as an array interval (camera pitch) of the imaging elements 5-1 to 5-n.

In the planar layout shown in FIG. 2, only two imaging units 30-1 and 30-n corresponding to two cameras are illustrated for the sake of simplicity. The imaging units 30-1 and 30-n are respectively configured by the lenses 4-1 and 4-n and imaging elements 5-1 and 5-n, and an interval between these lenses 4-1 and 4-n and the imaging elements 5-1 and 5-n is specified to be an imaging distance f. In order to capture an image (2D image) of an object at a finite distance Lc (to be referred to as an imaging distance Lc hereinafter) from the lenses 4-1 and 4-n and its surrounding space, relative positions between the lenses 4-1 and 4-n and the imaging elements 5 can be shifted to adjust imaging distances f (distances along the Z direction) between them. More specifically, the lenses 4-1 and 4-n are shifted with respect to the imaging elements 5 to change imaging relationships of the lenses 4-1 and 4-n with respect to the imaging elements 5, thereby changing imaging ranges. By adjusting the imaging relationships of the lenses 4-1 and 4-n, the imaging ranges of the multi-camera 1 can overlap each other at an imaging reference distance Lc, as indicated by hatching. The lenses 4-1 and 4-n have certain field angles, and the imaging ranges of the multi-camera 1 are specified by these field angles and imaging reference distance Lc.

A range of an X-Y plane at the imaging reference distance L in a space where the imaging ranges overlap each other is defined as the projection plane 2 under a given condition to be described later. Before and after the projection plane 2, an imaging range 6 extends, as shown in FIG. 2. Within this imaging range 6, the real object 3-1 is located on the front side (in a projecting direction) of the projection plane 2 by a distance z_n. Or the real object 3-2 is located on the projection plane 2, or the real object 3-3 is located on the back side (in a depth direction) of the projection plane 2 by a distance z_f. Then, when images of the object are captured in this state, they can be displayed as a stereoscopic image on the display device. These distances z_n and z_f which allow images to be displayed as a stereoscopic image correspond to a projecting display region and depth display region on the display device side. That is, the distances z_n and z_f also define stereoscopic imaging limit regions.

Figure 3:
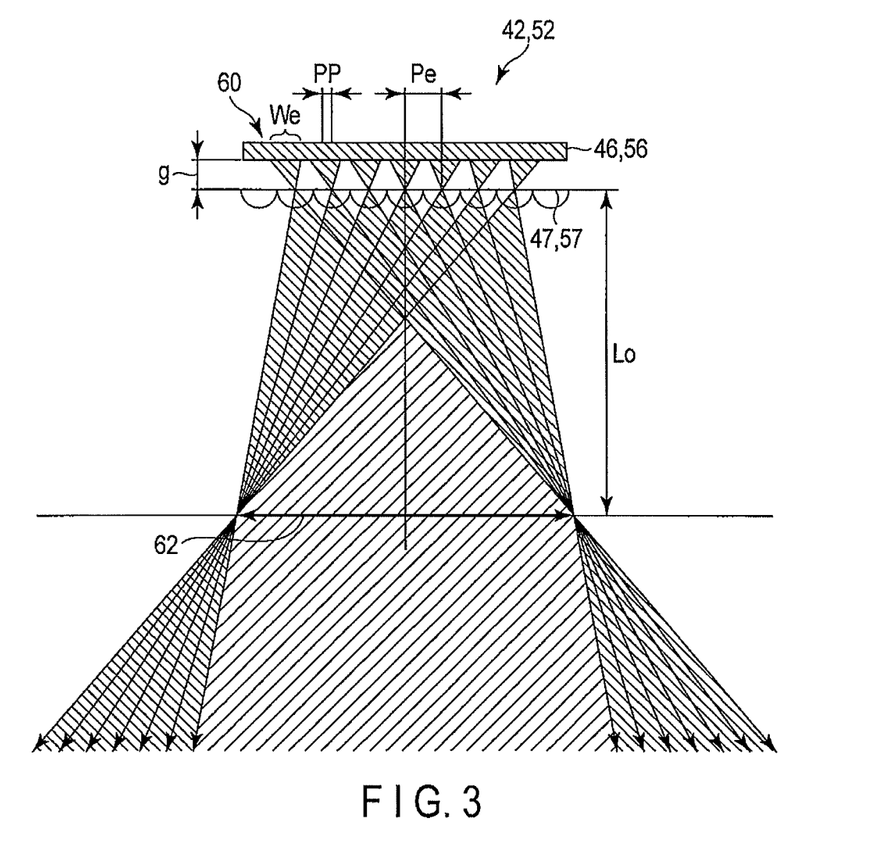
FIG. 3 is a planar layout view showing the relationship among a display device, visible region, and observation reference plane in an apparatus for displaying a stereoscopic image shown in FIG. 1.

As shown in FIG. 3, the display devices 42 and 52 are configured by arranging the parallax barriers 47 and 57 in front of the front surfaces of the flat display panels 46 and 56. A gap g is assured between the flat display panels 46 and 56 and the parallax barriers 47 and 57. Each of the flat display panels 46 and 56 has a display screen having the vertical and horizontal directions. On this display screen, pixels each having a predetermined width are arrayed in a matrix at a given pixel pitch pp. Each of the parallax barriers 47 and 57 is configured by a lenticular sheet or slit sheet in a one-dimensional II system. On each of the parallax barriers 47 and 57, a large number of cylindrical lenses or slits are arrayed at a lens pitch Pe along the horizontal direction (x direction). Or each of the parallax barriers 47 and 57 is configured by a fly-eye lens sheet or pinhole sheet in a two-dimensional II system, and a large number of microlenses or pinholes are arrayed at lens pitches Pe(H) and Pe(V) along the horizontal direction (x direction) and vertical direction (y direction). These cylindrical lenses, slits, microlenses, or pinholes are called optical apertures or optical pupils. In a stereoscopic image display system based on the II system, the array pitch Pe (horizontal pitch Pe(H) or vertical pitch Pe(V)) of the optical apertures or optical pupils is set to be an integer multiple of the pixel pitch pp at which pixels are arrayed on the display screen.

Element image regions 60 are defined on the display screen of each of the flat display panels 46 and 56 by dividing and segmenting the display screen into regions facing the optical apertures or optical pupils. That is, in the stereoscopic image display system based on the one-dimensional II system, the regions 60 where element images are displayed are defined in correspondence with the respective cylindrical lenses or slits, and the element image regions 60 are successively arrayed in the x direction. Also, in the stereoscopic image display system based on the two-dimensional II system, the regions 60 where element images are displayed as a 2D image elements (a planar image elements) are defined in correspondence with the respective microlenses or pinholes, and the element image regions 60 are successively arrayed in a matrix in the x and y directions. The element image regions 60 are defined depending on an observation reference visual distance Lo and an observation reference plane 62 on the observation reference visual distance Lo, as references of a normal stereoscopic observation range which are set for each of the display devices 42 and 52. Parallax images in various directions, which are captured by the multi-camera, are distributed to the element image regions to display element images on these element image regions 60. Please refer to a disclosure, for example, in JP-A 2005-331844 (KOKAI), which describes details of distribution of the parallax images to the element image regions.

As for the multi-camera 1, as has already been described above, the imaging reference distance Lc and interval x_c are given by:

$$g:pp=Lc:x\_c$$

where pp is a pixel interval (pixel pitch) on each of the display panels 46 and 56, and g is an interval (gap length) between each of the parallax barriers 47 and 57 and the display screen of each of the display panels 46 and 56. When equation (1) holds, and the imaging reference distance Lc is set as the observation reference visual distance Lo, a stereoscopic image having the same size as each of the real objects 3-1 to 3-3 is formed in front of or on the back side of each of the display devices 42 and 52. The imaging reference distance Lc, at which a formation relationship of the stereoscopic image having the same size as each of the real objects 3-1 to 3-3 in front of or on the back side of each of the display devices 42 and 52 is satisfied, is called the projection plane 2 shown in FIG. 2. Using this projection plane 2 as an imaging reference plane, a high-resolution stereoscopic image free from any distortion can be displayed based on captured image data on each of the display devices 42 and 52. The projection plane 2 as the imaging reference plane is different from an imaging plane which is defined by a distance to an object when an image of the object is in focus, and that object is formed as images on the imaging elements 30-1 to 30-n. That is, the projection plane 2 is defined as the imaging reference plane which allows to acquire captured image data based on which a high-resolution stereoscopic image free from any distortion can be displayed on each of the display devices 42 and 52.

The projection plane 2 corresponds to the imaging reference plane which matches the display screen of each of the display devices 42 and 52. The imaging reference distance is set as the observation reference visual distance of the three-dimensional display, and an imaging position is set as a viewpoint on the observation reference plane of the three-dimensional display, thereby displaying an object to be captured in a real scale. This projection plane 2 corresponds to the display screen displayed on each of the display devices 42 and 52 shown in FIG. 1, and it is preferable to capture an image of an object with reference to the projection plane 2 as the imaging reference plane. In place of displaying the projection plane 2 in each of the display devices 42 and 52, a numerical value associated with the imaging distance to the projection plane may be set by another method, or another display, for example, a display that requests to move the multi-camera forward or backward from the current position may be made.

In the imaging optical system shown in FIG. 2, when ranges used as parallax images are edited by clipping within the imaging range 6 of the multi-camera 1, even when an image of any real object is captured, it can be displayed in an enlarged scale as a stereoscopic image in the vicinity of the display screen of the three-dimensional display. Control of the ranges used as parallax images will be described below with reference to FIGS. 4A and 4B.

Figure 4A:
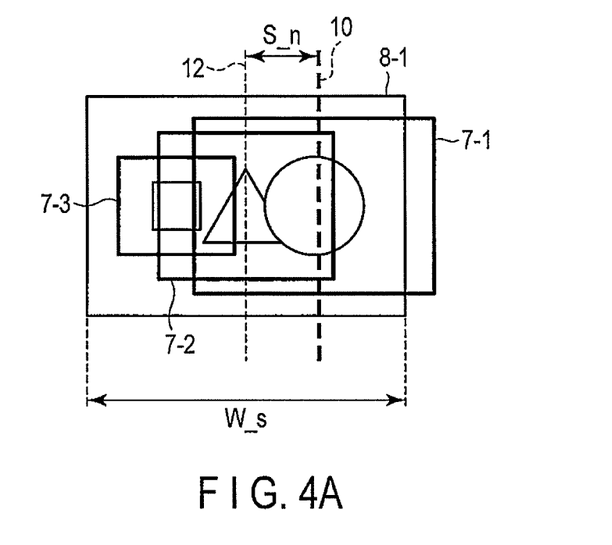
FIG. 4A is a schematic plan view showing an image captured by a left-side imaging element of the multi-camera shown in FIG. 2.
Figure 4B:
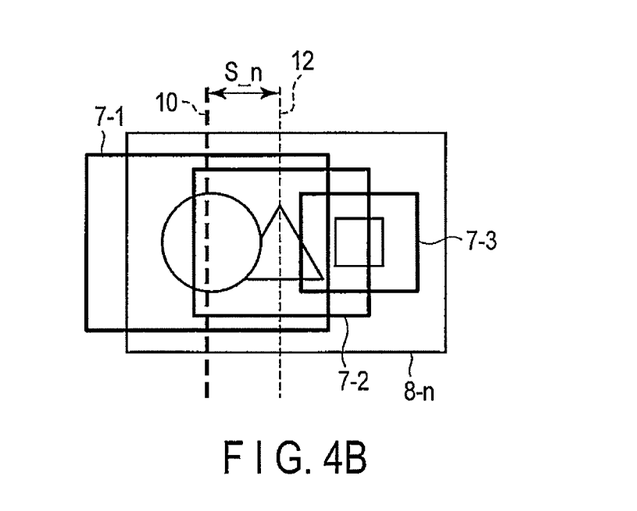
FIG. 4B is a schematic plan view showing an image captured by a right-side imaging element of the multi-camera shown in FIG. 2.

FIG. 4A shows an image 8-1 captured by the imaging element 5-1 on the left end of the multi-camera 1 shown in FIG. 2, and FIG. 4B shows an image 8-n captured by the imaging element 5-n on the right end of the multi-camera 1 shown in FIG. 2. The imaging elements 5-1 to 5-n each having an imaging width W_s have the same size, and output parallax images of the same size. An image of a real object (illustrated as "○"), which is located at the projecting position separated by the distance z_n from the projection plane 2, appears at the right end on the imaging element 5-1, as shown in FIG. 4A, and appears at the left end on the imaging element 5-n, as shown in FIG. 4B. Also, an image of a real object (illustrated as "Δ") on the projection plane 2, that is, on the imaging reference distance Lc, appears at the center on the imaging elements 5 without being shifted to the left or right in both FIGS. 4A and 4B. Furthermore, an image of a real object (illustrated as "□"), which is located at the depth position separated by the distance z_f, appears at the left end on the imaging element 5-1 in FIG. 4A, and appears at the right end on the imaging element 5-n in FIG. 4B.

The parallax images captured by the imaging elements 5-1 to 5-n are processed by the image processing unit 40, and are clipped in accordance with ranges to be displayed. A stereoscopic image can be displayed on the display device 42 according to the clipped parallax images. FIGS. 4A and 4B show ranges used as parallax images, that is, clipping regions 7-1, 7-2, and 7-3 to be clipped to be used as parallax images, which are bounded by bold lines. Note that the clipping regions 7-1, 7-2, and 7-3 are set on imaging planes of all the imaging elements 5-1 to 5-n to have the same size. A central reference line 10 of the clipping regions 7-1, 7-2, and 7-3 is shifted from a center 12 of each of the imaging elements 5-1 and 5-n by a shift value s_n or s_f, which is defined by equation (2). When a real object (illustrated as "○", "Δ", or "□") as an object to be clipped is specified, even when an image of any real object (illustrated as "○", "Δ", or "□") is captured, that captured image is displayed on the three-dimensional display to display a stereoscopic image in the vicinity of the display screen. In this case, for the shift value s_n (or s_f), equation (2) holds from a relationship of similar triangles:

$$s\_n : x\_c = z\_c : Lc$$

where x_c is an x-coordinate of each of the lenses 4-1 and 4-n with reference to the center (corresponding to the central reference line 10) of the camera 1.

In case of perspective projection, the real object ("○") at the projecting position appears to have a large size, and the real object ("□") at the depth position appears to have a small size. Therefore, a broad clipping range 7 is set for the real object ("○") at the projecting position, and a narrow clipping range 7 is set for the real object ("□") at the depth position, thus allowing to display homeostatic sizes.

Images in the clipping ranges 7 are decomposed into pixel levels, and are assigned to the display screen of the display panel 46 as components of element images. On pixels of the three-dimensional display, which is configured by exit pupils and pixel groups on its back surface, information changes depending on observation angles, and these pixels behave as those which present parallax information, thus displaying a stereoscopic image on the display panel 46. Therefore, the display panel 46 displays a clip image of one of the objects 3-1 to 3-3, on which the photographer focuses interest.

As described above, of the multi-viewpoint images 8-1 to 8-n to be captured, regions used as parallax images, that is, the clipping regions 7-1, 7-2, and 7-3 are selected. As long as images of the real objects 3-1 to 3-3 are captured within the imaging range 6, a three-dimensional image can be displayed based on the captured images in the vicinity of the display screen. More specifically, the sizes of the clipping ranges 7-1, 7-2, and 7-3 indicate those of images when they are displayed on the three-dimensional display, and the shift value s_n or s_f of a position for each viewpoint image of each of the clipping ranges 7-1, 7-2, and 7-3 defines a depth or projecting distance to be displayed on the display screen. In other words, the shift value s_n or s_f has a correlation with a distance in the depth or projecting direction from the projection plane 2.

The method of controlling the clipping regions 7-1, 7-2, and 7-3 suffers a problem about an image distortion when the real object (illustrated as "○" or "□") other than the real object (illustrated as "Δ") on the projection plane 2 is displayed in the vicinity of the display screen. The layout of the multi-camera 1 shown in FIG. 2 should be designed to reflect the relationship between the pixels and exit pupils of the three-dimensional display, as described above with reference to FIG. 3. However, when the real object in front of or on the back side of the projection plane 2 is displayed in the vicinity of the display screen by adjusting its clipping range, since the observation reference visual distance and imaging reference distance are different, a mismatch of perspective degrees occurs in a strict sense. In display, the mismatch of perspective degrees appears as a distortion. When the distance z_n or z_f assumes a small value, such distortion is not conspicuous, but it is preferable to display a display image without any distortion. Furthermore, when shift positions of the lenses 4-1 and 4-n with respect to the imaging elements 5 are fixed, imaging ranges overlap each other at a certain imaging reference distance Lc of the projection plane 2. Hence, when an object to be captured is set in advance, it is desirable to capture an image of that object from a position at which the projection plane 2 nearly matches that object to be captured, that is, a position separated from the object to be captured by the imaging reference distance Lc. When the objects 3-1 to 3-3 to be mainly displayed are laid out to be separated from the projection plane 2 by too large distances, the following problems are posed in addition to the aforementioned problem of perspective degrees. As the first problem, upon execution of clipping in consideration of the shift value (s_n, s_f), the imaging range may become insufficient. In this case, the clipping range 7 with reference to "○" in FIG. 2 corresponds to the imaging range. As the second problem, upon execution of clipping in consideration of the shift value (s_n, s_f), a resolution may become insufficient. In this case, since an image is clipped by the clipping range 7 with reference to "□" in FIG. 2, a resolution may become insufficient. From this viewpoint, it is preferable to adjust (correct) the imaging reference distance.

When the shift positions of the lenses 4-1 and 4-n with respect to the imaging elements 5 can be changed, the problem of the insufficient imaging range is not posed. However, the problem of a distortion due to a difference between the observation reference visual distance and imaging reference distance and that of the insufficient resolution cannot be solved.

From the aforementioned viewpoints, as long as an object on which the photographer or observer focuses interest is set on the projection plane as an object to be captured, even when that object to be captured is clipped, no mismatch of perspective degree occurs, and a display image free from any distortion can be displayed.

In the multi-camera system according to the embodiment shown in FIG. 1, either even when the photographer decides one of the objects 3-1 to 3-3 to be mainly displayed or even when the observer of the three-dimensional display decides an object to be mainly displayed, the photographer can recognize and optimize the object. When the photographer decides one of the objects 3-1 to 3-3 to be displayed, he or she specifies an object to be displayed via the input unit 45 with reference to contents displayed on the display device 42, so as to display a display object screen used to specify the object to be displayed, thereby settling the object to be displayed. As the latter example in which the observer decides the object to be mainly displayed, a case is assumed wherein the three-dimensional display unit 52 is placed at a remote place, and the observer inputs a designation instruction of a range to be observed in more detail via the input unit 55 while observing contents displayed on the three-dimensional display unit 52. In response to the designation instruction of the range to be observed in more detail, a display object screen used to specify the object to be displayed may be displayed to settle the object to be displayed. On this display object screen, multi-camera imaging is executed to be free from any insufficient resolution after clipping by correcting the imaging distance of the multi-camera to the object to be displayed so as to be matched with the projection plane.

Figure 5:
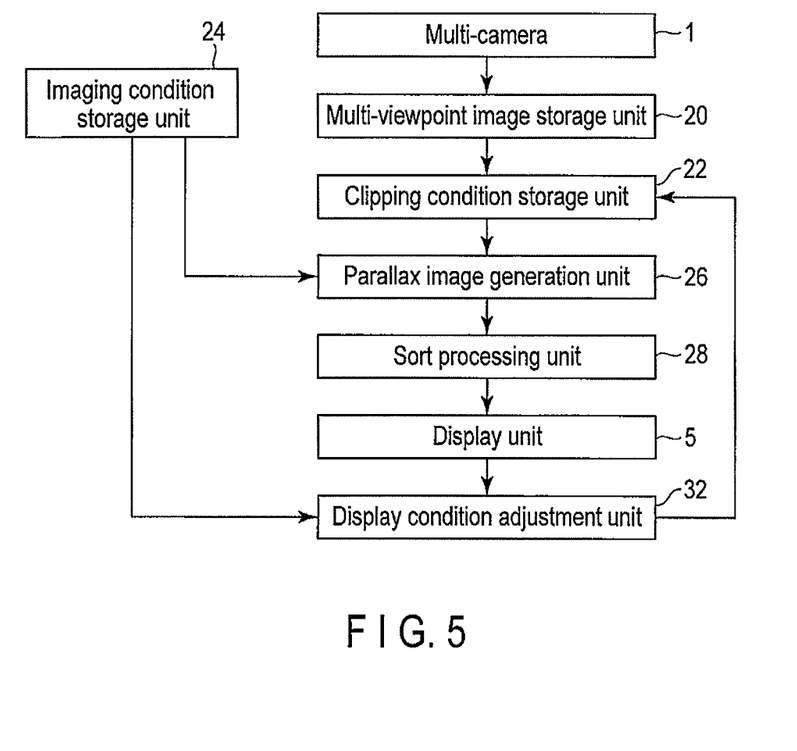
FIG. 5 is a schematic block diagram showing a stereoscopic imaging/display device according to an embodiment, which captures an image of an object, and displays it as a stereoscopic image, in the multi-camera imaging system shown in FIG. 1.
Figure 6:
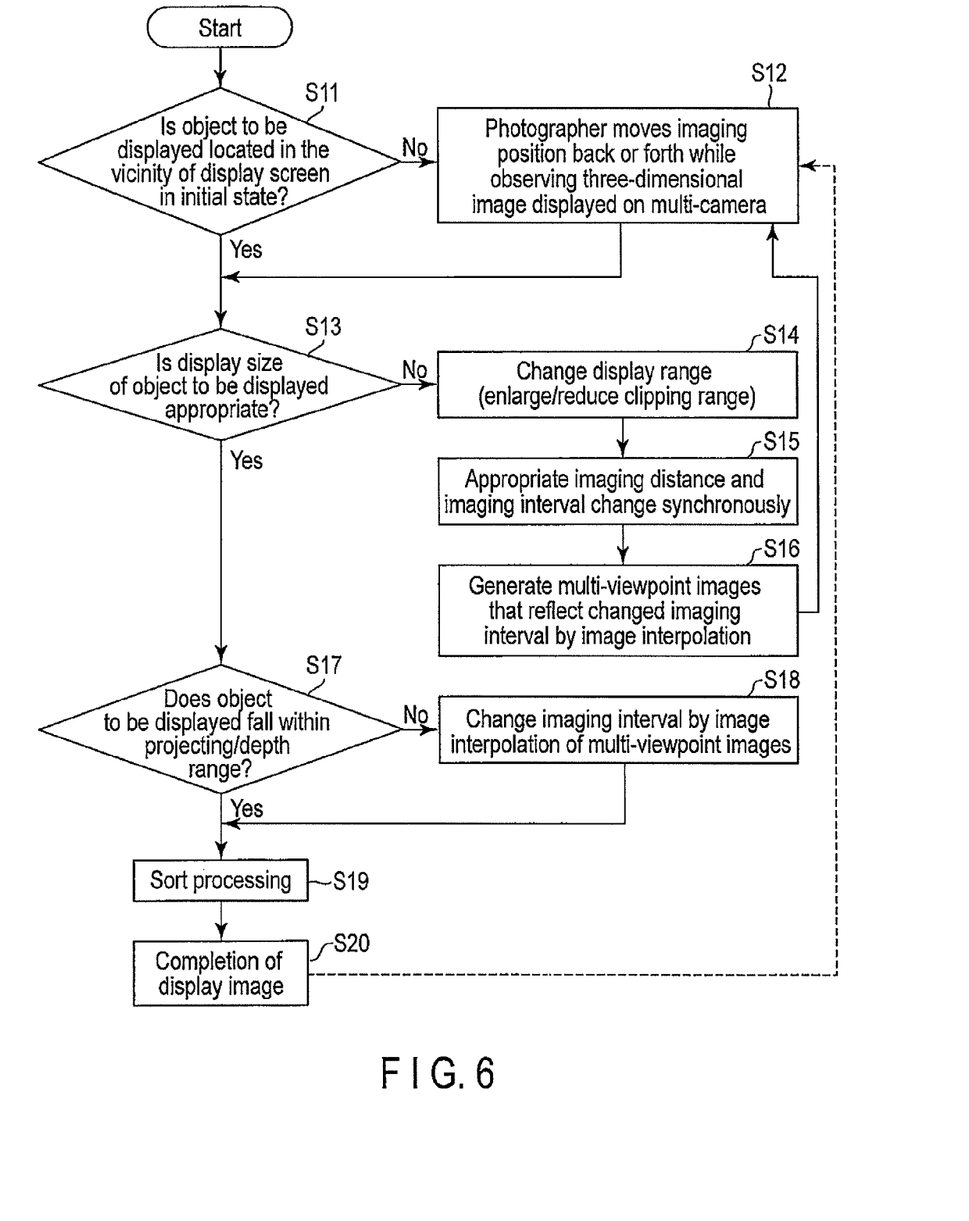
FIG. 6 is a flowchart showing a method of displaying a stereoscopic image from images acquired by the multi-camera in the stereoscopic imaging/display device shown in FIG. 5.

FIG. 6 is a flowchart required to carry out optimal imaging when the photographer decides an object to be mainly displayed using the image processing unit 40 shown as blocks in FIG. 5. In the image processing unit 40 shown in FIG. 5, a display unit 5 corresponds to the display device 42 shown in FIG. 1, that is, the viewer provided to the multi-camera 1 like that of a digital camera. The multi-viewpoint image processing sequence according to the embodiment will be described below with reference to FIGS. 5 and 6.

As described above, the layout of the multi-camera 1 reflects the configuration of the display unit in the stereoscopic image display apparatus. Therefore, preferably, the multi-camera 1 is configured so that the display screen of the viewer as the display unit 5 matches the projection plane 2. Also, the multi-camera is designed to have this configuration, thus improving usability of the multi-camera 1.

When the multi-camera 1 starts imaging (step S10), it is confirmed whether or not an object to be mainly displayed is displayed as a stereoscopic image in the vicinity of the projection plane 2 displayed within the viewer as the display unit 42 in an imaging start state (initial state) (step S11). If the object to be displayed is not displayed in the vicinity of the projection plane displayed within this viewer, the imaging position is moved back or forth while observing the viewer as the three-dimensional image display device to search for an imaging position where the object to be displayed is displayed on the projection plane 2 (step S12). In a state in which the object to be displayed is roughly displayed on the projection plane 2, it is judged whether or not the object is displayed to have an appropriate display size (step S13). When the display size of the object to be displayed is to be adjusted in step S13, an instruction to change a display range (clipping range) is input to the multi-camera 1 (step S14). More specifically, processing for enlarging or reducing the display size of the object is executed while maintaining the shift values (s_n, s_f) of the clipping regions 7-1, 7-2, and 7-3.

Figure 7:
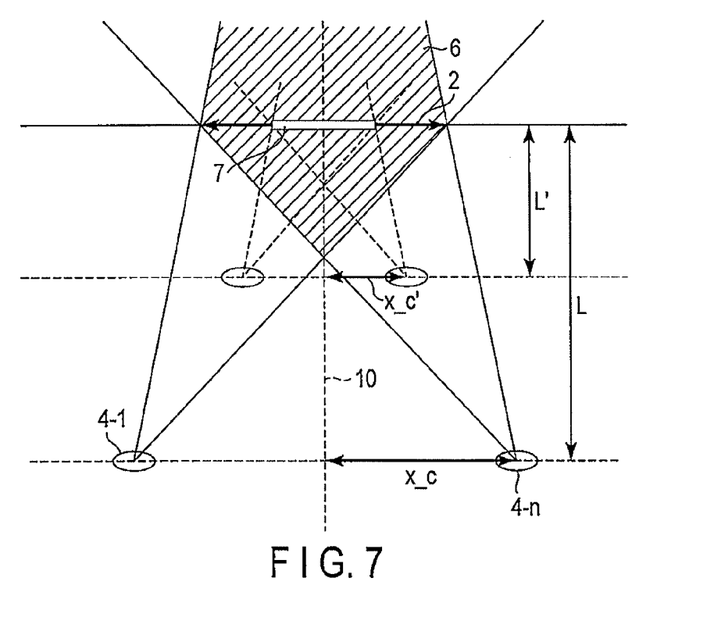
FIG. 7 is a layout view for explaining a method of adjusting an imaging reference distance in the imaging method of a stereoscopic image shown in FIG. 4.
Figure 8:
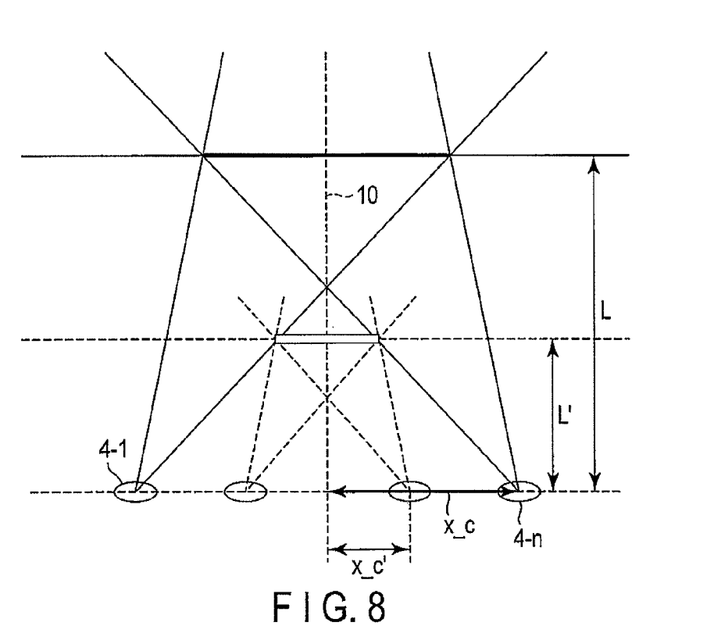
FIG. 8 is a layout view for explaining a method of adjusting an imaging reference distance in the imaging method of a stereoscopic image shown in FIG. 4.

In order to maintain perspective degrees upon enlarging or reducing the ranges of the clipping regions 7-1, 7-2, and 7-3, data is fed back to the imaging reference distance to adjust (correct) the imaging reference distance and camera interval (step S15). FIGS. 7 and 8 show a state of processing in which the imaging reference distance is changed from a distance L to a distance L', and the imaging reference distance is adjusted based on this changed imaging distance.

FIGS. 7 and 8 show imaging positions of the imaging units 30-1 to 30-n required to display images free from any distortion when the clipping range 7-1 is set to be a range narrower than the projection plane 2. When the width of the projection plane 2 is set to be Wt, and that of the clipping region 7-1, that is, the clipping range is set to be W_c, an imaging reference distance L' and camera position x_c' are changed to satisfy equation (3) (step S15).

$$W\_c/W\_t = x\_c'/x\_c = L'/L$$

When the clipping range 7-1 is changed, as shown in FIG. 7, while maintaining the imaging position, an ideal imaging reference distance L is set to be a short distance L'. Therefore, the projection plane 2 after the clipping range 7-1 is changed is set on the front side, as shown in FIG. 8, compared to the previous projection plane 2 before the clipping range is changed, as shown in FIG. 7. As a result, a z-coordinate of the object to be displayed, which is displayed on the viewer, is relatively moved to the back side. Thus, the photographer is informed of an imaging position separated by a distance larger than the imaging reference distance, thereby prompting the photographer to change the imaging position (that is, to move forward), so as to capture an image at the imaging reference distance.

With the aforementioned processing, the camera positions x_c of the imaging units 30-1 to 30-n are changed to camera positions x_c'. This change corresponds to that to imaging units 30-k to 30-m, which are selected from the imaging units 30-1 to 30-n and are used as valid captured image data (k and m are integers which satisfy 1<k<m<n). Upon changing to the imaging units 30-k to 30-m, images from the imaging units 30-k to 30-m are interpolated to prepare parallax images as many as the required number of parallax images in step S16. The interpolated parallax images are preferably colored to images different from the non-interpolated parallax images so as to clearly specify that they are generated by interpolation.

The photographer confirms that the imaging distance is changed, and the projection plane 2 is changed within the display screen upon changing of the clipping range, as described above, and need only move the multi-camera position used in imaging to shorten a distance to the object to be captured. Although it is ideal to change the camera positions x_c which is expressed depending on camera coordinate, it is especially difficult to narrow down the camera interval in terms of the structure of the multi-camera. Therefore, it is preferable to leave the actual camera pitch of the multi-camera unchanged. Then, the camera pitch is left unchanged, and multi-viewpoint images imaging positions (x-coordinates) x_c' are changed can be generated by image interpolation processing based on either an interpolation or extrapolation method depending on imaging conditions, and these multi-viewpoint images can be used (step S16). A screen is displayed using these interpolated multi-viewpoint images, and step S12 is executed according to this display screen.

Figure 9:
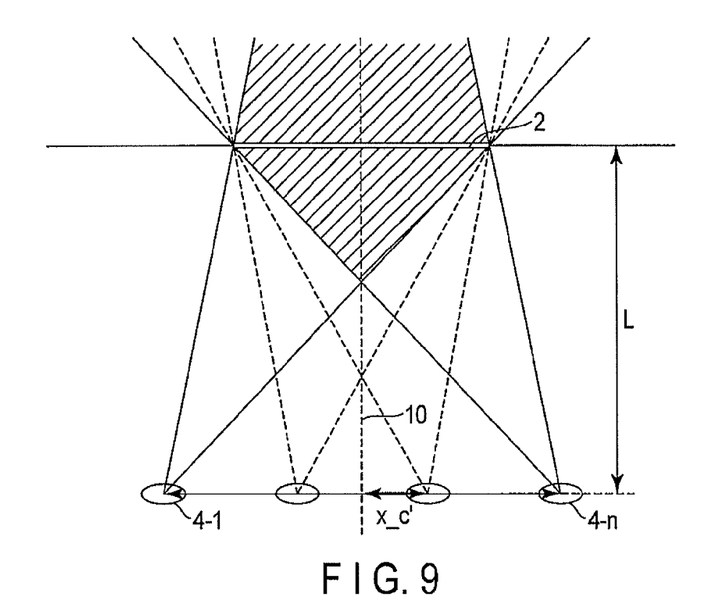
FIG. 9 is a layout view for explaining a method of adjusting an imaging reference distance in the imaging method of a stereoscopic image shown in FIG. 4.

Even when the object to be displayed can be displayed at a display position as a result of movement of the imaging position and image interpolation, as described above, it may not often fall within a display range in the depth direction of the three-dimensional display due to a large depth, that is, a large thickness of the object to be displayed (NO in step S17). In such case, when the imaging units 30-1 to 30-n are shifted to reduce the camera coordinates x_c to, for example, ½, as shown in FIG. 9, a space of the displayed state can be reduced nearly to ½ in the z direction (step S18). In the multi-camera, since it is impossible to shift the imaging units 30-1 to 30-n in practice, captured image data at the ½ camera interval need only be prepared by the image interpolation processing even for images captured at the camera coordinates x_c.

If the object to be displayed falls within the display range in the depth direction of the three-dimensional display in step S17, or if the object to be displayed is adjusted to fall within the display range in the depth direction of the three-dimensional display by the processing in step S18, image data from the imaging units 30-1 to 30-n or 30-k to 30-m under this imaging condition are sorted to display images to generate element image data, and are stored in a storage device (not shown) (step S19). The element image data are prepared in this way, thus ending a series of processes (step S20). If necessary, the processes from step S20 are repeated again for detailed settings.

As shown in FIG. 5, the image processing unit which executes the aforementioned sequence includes a storage unit 20 which stores multi-viewpoint images captured by the multi-camera 1, and an imaging condition storage unit 24 which stores the imaging condition of the multi-camera 1. Following clipping conditions C1 to C3 for the multi-viewpoint images captured by the multi-camera 1 are stored in a clipping condition storage unit 22.

(C1) Clipping size (an initial value is 1 as a normalized value)

(C2) Interval of multi-camera 1 (an initial value is 1 as a normalized value)

(C3) Imaging reference distance (which can be adjusted artificially using the shift value (an initial value=0))

A parallax image generation unit 26 executes the image interpolation processing and clipping processing according to the position of the multi-camera 1 stored in this clipping condition storage unit 22, when an image acquisition position is required to be change. Parallax images generated by this parallax image generation unit 26 are sorted for respective pixels in a sort processing unit 28, and are changed to a format to be displayed on the three-dimensional display. In this case, the format for the three-dimensional display means an element image array in which element images are arranged in a tile pattern.

The element image array generated by the sort processing unit 28 is supplied to the display unit 5, which then displays a three-dimensional image. The element image array supplied to the display unit 5 is also supplied to a display condition adjustment unit 32. While observing the image displayed on the display unit 5, the clipping size and the position (interval) of the multi-camera 1 are adjusted using the display condition adjustment unit 32. In this case, as has already been described above, the adjustment of the position (interval) of the multi-camera 1 includes a virtual camera position or camera interval which allows to acquire captured image data prepared by the image interpolation. After the adjustment of the display condition adjustment unit 32, especially, after the clipping size is changed, the imaging condition is reflected, and the imaging reference distance and camera interval have to be corrected while maintaining similarity with the layout of the imaging condition. The imaging reference distance can be artificially changed by adjusting the shift values of the clipping ranges 7-1, 7-2, and 7-3. However, basically, it is prompted to change the imaging reference distance in place of adjustment of the shift values of the clipping ranges in the display control adjustment unit 32. Parameters adjusted by the display condition adjustment unit are reflected to contents in the clipping condition storage unit 24. As a result, the display state of the three-dimensional image on the display unit 5 is updated in real time.

In this case, when an image is displayed on the display unit 5 while reflecting the display condition set by the display condition adjustment unit 32, the imaging ranges of the multi-viewpoint images may become insufficient. Images of regions having the insufficient imaging regions may be replenished by substitution processing using parallax information of already acquired multi-viewpoint images. The observer may be informed of these substituted parallax images by coloring substituted parts to indicate substituted images.

The display condition adjustment unit 32 preferably include a tracking processing unit (not shown), which recognizes an object to be displayed in the vicinity of the display screen by image processing, and can track the object even when the imaging condition has changed and the object to be captured has moved. Preferably, this tracking processing unit always displays the object by automatically changing or updating the parameters stored in the clipping condition storage unit 22.

Figure 10:
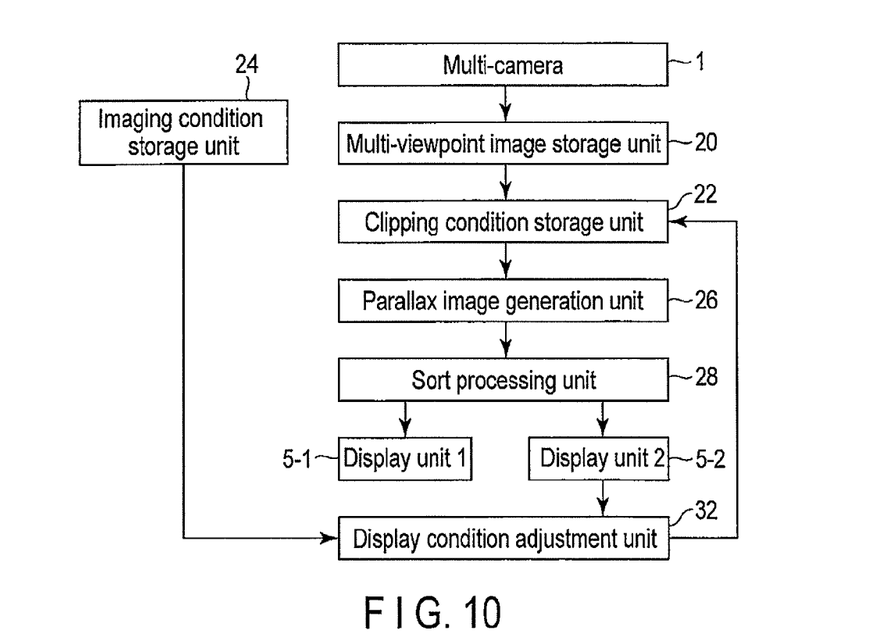
FIG. 10 is a schematic block diagram showing a stereoscopic imaging/display device according to another embodiment, which captures an image of an object, and displays it as a stereoscopic image, in the multi-camera imaging system shown in FIG. 1.
Figure 11:
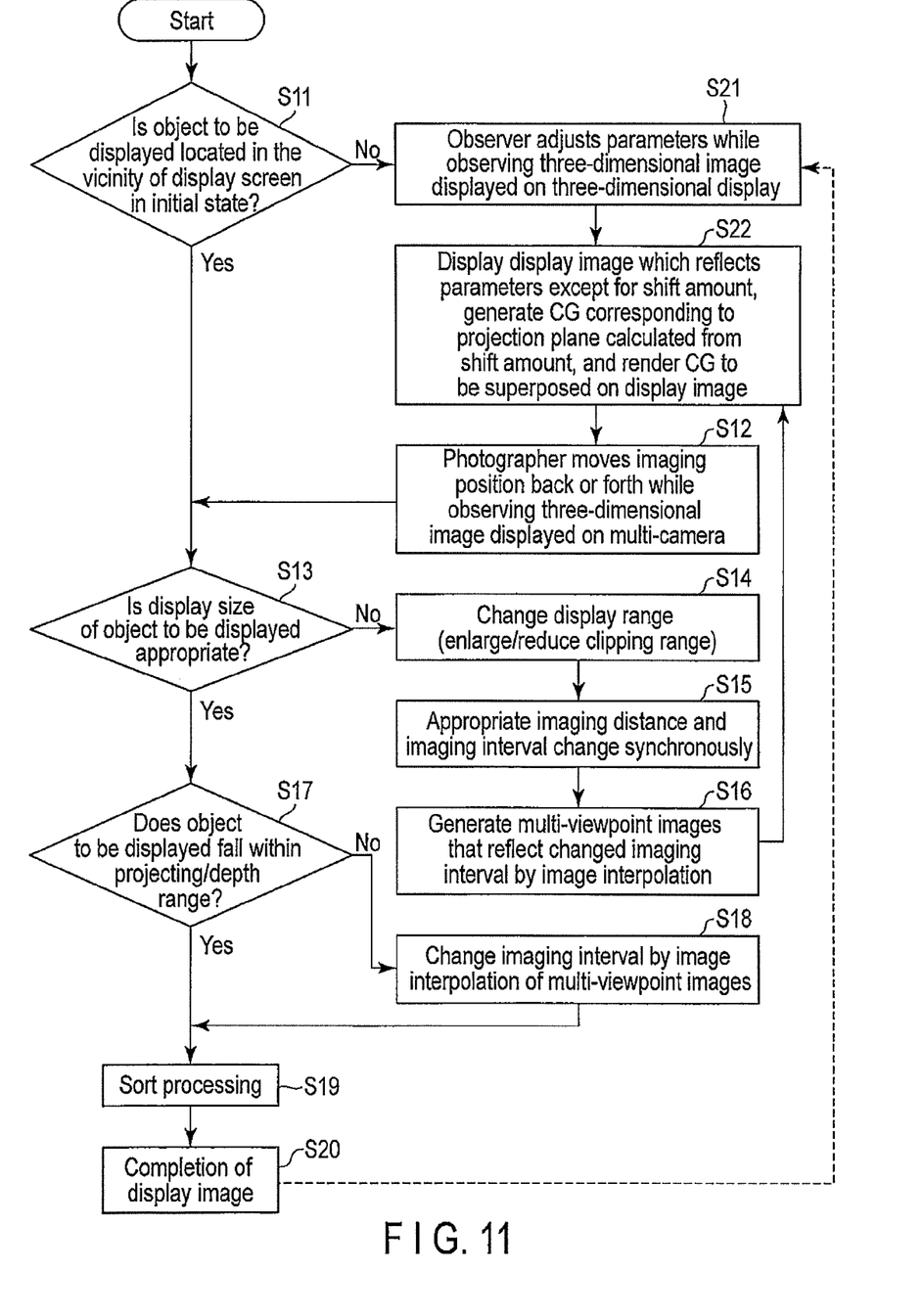
FIG. 11 is a flowchart showing a method of displaying a stereoscopic image from images acquired by the multi-camera in the stereoscopic imaging/display device shown in FIG. 10.

FIGS. 10 and 11 show the image processing unit 40, which allows the observer of the three-dimensional display to decide the object to be mainly displayed, and the processing sequence in this image processing unit 40. The unit shown in FIG. 10 includes two displays 5-1 and 5-2, as shown in FIG. 1, unlike the processing unit shown in FIG. 5. One display unit 5-1 corresponds to the viewer provided to the multi-camera 1, and the other display unit 5-2 corresponds to the three-dimensional display.

As in the processing in the flow chat shown in FIG. 6, the multi-camera 1 starts imaging (step S10). Initially, the observer observes a three-dimensional image in an imaging start state (initial state), and adjusts parameters. The observer adjusts the parameters while observing the display unit 5-2. The adjustment parameters are displayed on this display unit 5-2, and the parameters are input to the display condition adjustment unit 32 of the image processing unit 40 via the input unit 55 and the transmission/reception units 48 and 58 (step S21). An image to which parameters other than the shift amount as a parameter are reflected is displayed on the display unit 5-2. An image of the virtual projection plane 2 converted from the shift amount is generated by CG. This projection plane 2 is colored and displayed in the display unit 5-2 (step S22). Unlike the photographer, the observer cannot change the imaging reference distance L. Hence, even when the shift amount as the parameter is manipulated, the projection plane 2 is merely displayed on the display screen of the three-dimensional display. The photographer observes the same screen as that observed by the observer in the viewer as the display unit 42. When an object to be displayed is not displayed in the vicinity of the projection plane displayed in this viewer, the imaging position is moved back or forth while observing the viewer as the three-dimensional image display device, thus searching for an imaging position where the object to be displayed is displayed on the projection plane 2 (step S12).

The observer judges whether or not the object is displayed to have an appropriate display size in a state in which the object to be displayed is roughly displayed on the projection plane 2 as a result of movement of the photographer (step S13). When the observer wants to adjust the display size of the object to be displayed in step S13, he or she inputs an instruction to change a display range (clipping range) to the image processing unit 40 via the input unit (step S14). More specifically, processing for enlarging or reducing the display size of the object while maintaining the shift values (s_n, s_f) of the clipping regions 7-1, 7-2, and 7-3 is executed.

When the ranges of the clipping regions 7-1, 7-2, and 7-3 are to be enlarged or reduced, in practice, data is fed back to the imaging reference distance to adjust the imaging reference distance and camera interval (step S15), as has been described above with reference to FIGS. 7 and 8. After that, image interpolation processing upon change of the reference imaging distance is executed, and multi-viewpoint images whose imaging positions (x-coordinates) x_c' are changed are generated (step S16). A screen is displayed using the interpolated multi-viewpoint images, and step S12 is executed according to this display screen.

If the object does not fall within the display range in the depth direction of the three-dimensional display due to a large depth, that is, a large thickness of the object to be displayed (NO in step S17), the camera coordinates x_c are shifted, as shown in FIG. 9, thus reducing (compressing) a space of the displayed state in the z direction (step S18). In the multi-camera, since it is impossible to shift the imaging units 30-1 to 30-n in practice, captured image data at the ½ camera interval need only be prepared by the image interpolation processing even for images captured at the camera interval x_c.

If the object to be displayed falls within the display range in the depth direction of the three-dimensional display in step S17, or if the object to be displayed is adjusted to fall within the display range in the depth direction of the three-dimensional display by the processing in step S18, image data from the imaging units 30-1 to 30-n or 30-k to 30-m under this imaging condition are sorted to display images, so as to generate element image data, and are stored in a storage device (not shown) (step S19). The element image data are prepared in this way, thus ending a series of processes (step S17). If necessary, the processes from step S21 are repeated again for detailed settings.

Figure 12:
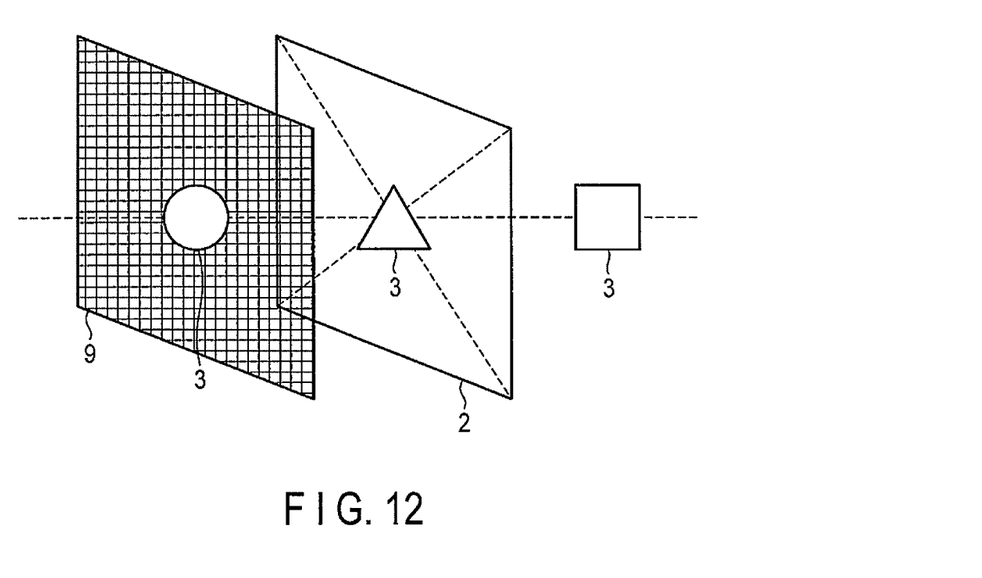
FIG. 12 is a schematic view showing an example of a display screen displayed by a display unit required to display a stereoscopic image shown in FIG. 1.

Note that the input clipping sizes of the clipping regions and the camera interval, which changes in synchronism with the sizes, and the camera interval manipulation in the compression display processing of the depth method are taken into consideration, and they are stored in the clipping condition storage unit 22 as clipping conditions. In this processing, the shift values are not reflected. This is because a shift instruction is required to be displayed on the display unit to prompt the photographer to move the imaging position. At this time, as for which part of the object to be captured is to be displayed, a shift value to be displayed on the display screen, that is, the imaging reference distance is detected based on the shift value manipulated by the observer using the display condition adjustment unit 32. For example, as shown in FIG. 12, a virtual plane 9 of the object to be captured is display by means of CG. The photographer can move the imaging position back or forth so that this plane 9 of the object to be captured matches the projection plane.

With the aforementioned method, a divergence of the imaging reference distance from an ideal value, which causes a distortion in three-dimensional image display is signaled to the photographer to give a guide to move to an ideal imaging reference distance.

Note that details of the image interpolation processing have not been described. For example, an existing method such as a known bilinear method or bicubic method need only be used. Also, the camera may be expected to have functions such as zoom-in/out, lens shift, and movement of a focal length, and it is apparent that the present embodiment can be applicable to these operations.

As described above, there can be provided the captured image acquisition method, which allows to acquire multi-viewpoint images required to display an object to be displayed free from any distortion within a display range of a three-dimensional display having a parallax barrier, and is required to display a stereoscopic image, and a method and apparatus for displaying a stereoscopic image from the acquired images, can be provided.

According to a stereoscopic image display apparatus which captures a stereoscopic image of the present embodiment, in the method of acquiring, by actual imaging, and displaying multi-viewpoint images for a three-dimensional display based on the parallax barrier system, a photographer is informed of an appropriate imaging reference distance to appropriately display a desired object to be displayed within a display range of the three-dimensional display.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stereoscopic image display apparatus comprising:
a first three-dimensional display device includes,
   a first display unit configured to display a 2D image, the 2D image including elemental images, and
   a first light control unit configured to control directions of light rays emitted from the first display unit, wherein the first display unit displays each of the elemental images in a first specific area determined with the directions of the controlled light rays, so as to display a three dimensional image;
a multi camera configured to capture multi-viewpoint images of a real object from specific view points placed at certain intervals, wherein the multi-camera has a projection plane serving as an imaging reference plane;
an image processing unit configured to process images taken by the multi camera, the image processing unit including;
   a parallax image generation unit configured to generate parallax image data including clip parallax images having specified ranges which are clipped from the multi-viewpoint images based on information about clipping ranges of the multi-viewpoint images,
   a sort processing unit configured to sort pixels from the clip parallax images and rearrange the sorted pixels to generate the elemental images, and
   a display condition adjustment unit configured to adjust parameters required to display the three-dimensional image, wherein the parameters are so adjusted as to capture the real object as the multi-viewpoint images having a desired size at the vicinity of the projection plane with reference to the displayed three-dimensional image,
   wherein the image processing unit is configured to correct the imaging reference distance and the intervals of the view points based on the adjusted parameters and the imaging condition to derive a corrected imaging reference distance and a corrected interval, which are required to display the three-dimensional image without any distortion.

2. The stereoscopic image display apparatus according to claim 1, further comprising:
a second three-dimensional display device includes;
   a second display unit configured to display the 2D image, and
   a second light control unit configured to control directions of light rays emitted from the second display unit, wherein the second display unit displays each of the elemental images in a second specific area determined with the directions of the controlled light rays, so as to display the three dimensional image; and
an input unit configured to input an instruction.

3. The stereoscopic image display apparatus according to claim 2, wherein the display condition adjustment unit adjusts the parameters based on a clipping condition, when the instruction including the clipping condition is input to the input unit, the parallax image generation unit generates the parallax image data including the clip parallax images in accordance with the adjusted parameters, and the image processing unit calculates a virtual projection plane based on the input clipping condition and causes the second display unit to display the virtual projection plane.

4. The stereoscopic image display apparatus according to claim 3, wherein the parallax image generation unit generates the parallax image data which includes the parallax images reflecting the display condition, wherein the parallax images include interpolation images each of which is calculated from substituting the parallax images adjacent to each other, when the multi-viewpoint images is insufficient for displaying the three-dimensional image.

5. The stereoscopic image display apparatus according to claim 4, wherein the display condition adjustment unit includes a tracking processing unit which is configured to recognize the real object to be captured to track the real object, and the tracking processing unit automatically updates the parameters for the clipping condition and causes the first three-dimensional display device to displays the three dimensional image, even when the imaging condition has been changed, and the real object to be captured has moved.

* * * * *